United States Patent [19]
Hussey

[11] Patent Number: 6,047,943
[45] Date of Patent: Apr. 11, 2000

[54] FLUID FLOW CONTROL SLEEVE VALVE

[76] Inventor: James J. Hussey, 438 W. Gaywood, Houston, Tex. 77079

[21] Appl. No.: 08/684,322

[22] Filed: Jul. 19, 1996

Related U.S. Application Data

[63] Continuation of application No. 08/396,112, Feb. 28, 1995, abandoned.

[51] Int. Cl.[7] ........................................................ F16K 7/07
[52] U.S. Cl. ................................ 251/5; 251/61.1; 251/358
[58] Field of Search .................................. 251/4, 5, 61.1, 251/358

[56] References Cited

U.S. PATENT DOCUMENTS

| | | |
|---|---|---|
| 3,047,008 | 7/1962 | Clarkson . |
| 3,078,675 | 2/1963 | Baldwin . |
| 3,494,588 | 2/1970 | Kisling, III . |
| 3,624,801 | 11/1971 | Gannon .................... 251/5 |
| 4,023,772 | 5/1977 | Ratelband . |
| 4,451,023 | 5/1984 | Zakai . |
| 4,619,436 | 10/1986 | Bonzer et al. . |
| 4,642,833 | 2/1987 | Stoltz et al. . |
| 4,796,804 | 1/1989 | Weiss . |
| 4,824,072 | 4/1989 | Zakai . |
| 5,035,259 | 7/1991 | Allen et al. . |
| 5,090,660 | 2/1992 | Ratelband . |

FOREIGN PATENT DOCUMENTS

1528949  12/1989  U.S.S.R. ..................................... 251/5

*Primary Examiner*—John Fox
*Attorney, Agent, or Firm*—Felsman, Bradley, Vaden, Gunter & Dillon, LLP

[57] ABSTRACT

A fluid flow control sleeve valve having a generally concave cylindrical deformable sleeve sealing against a core in the flow passage at rest and defining an annular flow passage in the housing when deformed, including a pressure chamber defined between the sleeve and the valve housing, and preferably including integral longitudinal and circumferential sleeve ribs, a concave sealing surface on the core and fins adjacent the core downstream partially conforming to the shape of a portion of the non-deformed sleeve.

19 Claims, 11 Drawing Sheets

FLUID FLOW CONTROL SLEEVE VALVE

This is a Continuation of application Ser. No. 08/396,112 filed on Feb. 28, 1995 now abandoned.

FIELD OF INVENTION

This invention relates to sleeve valves for industrial fluid flow control applications, such as relief valves and deluge valves.

BACKGROUND OF INVENTION

The present invention comprises an industrial scale fluid flow control valve of sleeve diaphragm design.

There are some inherent disadvantages in the physical construction and operation of present art tube diaphragm, or sleeve, valves. For instance, cavitation is not unusual at normal flow rates when the valve is connected to an open discharge. Present art valves also incur more or significant head loss. And upon occasion the conventional tube diaphragm, or sleeve, is damaged when the valve flanges are tightened beyond torque tolerances.

Advantages of the present design over existing valves are that the instant design does not require a cage to be associated with the core for diaphragm support. Rather, a generally concave deformable elastomer tube, or sleeve, of cylindrical shape, flexes and stretches between a "loaded", or deformed, open position and an "unloaded", or at rest, closed position. The sleeve preferably includes longitudinal and circumferential integral ribs, and the core preferably offers a mating concave surface to the sleeve. The concave shape of the sleeve is preferably an inverted sphere. This design incurs significantly lower head loss and provides a larger fluid passage with less turbulence within the valve than current designs on the market. Also cavitation does not occur at normal flow rates when the valve of the present design is connected to an open discharge.

U.S. Pat. Nos. 5,090,660 and 4,023,772 to Ratelband, U.S. Pat. No. 4,796,804 to Weiss, U.S. Pat. No. 5,035,259 to Allen, and U.S. Pat. Nos. 4,824,072 and 4,451,023 to Zakai disclose diaphragm valves that include sleeve-shaped elastic diaphragms which, although similar in some respects, are opposite in other regards to the present invention. For instance, Ratelband, Weiss and Zakai all appear to teach, to the contrary of the present invention, valves that are closed in their "loaded" or deformed condition and open in the "unloaded" or at rest condition. The present valve, by contrast, is designed to be closed in its "unloaded" at rest condition. Also, none of the art teaches longitudinal integral ribs on the sleeve, a core with a mating concave sealing surface, or a concave sleeve shape that comprises an inverted sphere.

SUMMARY OF THE INVENTION

The diaphragm tube or sleeve valve of the present invention includes a housing whose interior walls define a passage. A barrier or core is attached centrally within the passage. A generally concave cylindrical deformable sleeve sealingly attaches at its ends to the housing. The sleeve sealingly encloses the barrier or core at rest. The sleeve flexes and stretches outwardly to open an annular flow passage between the sleeve and the barrier when deformed.

The valve may contain fins located adjacent and downstream, or both downstream and upstream, of the core. The fin edges substantially conform to the shape of a portion of the undeformed sleeve.

The sleeve and the housing define a pressure chamber therebetween. Means exist for providing fluid communication between the pressure chamber and the passage. A pilot valve may lie in fluid communication with the pressure chamber. The pilot valve can selectively create a pressure differential between the chamber and the flow passage, which differential opens the valve by "loading" the sleeve on the interior.

In preferred embodiments, the sleeve assumes a partially inverted spherical shape in the unloaded state, which is when the pressure is balanced between the flow passage and the pressure chamber. Means for attaching the sleeve to the housing is provided in particular so that the sleeve will not become damaged by tightening the housing flanges.

In preferred embodiments, integral longitudinal and circumferential ribs are located on the sleeve, formed of sleeve materials. The barrier offers a matching concave seating surface. The pilot valve is operated by solenoid, by fluid pressure or by air pressure.

Studies have shown that a preferred material for the sleeve is comprised of hydrogenated nitrile rubber. The preferred modulus of elongation (ultimate elongation) for the sleeve lies between 100% and 500%.

BRIEF DESCRIPTION OF THE DRAWINGS

A better understanding of the present invention can be obtained from the detailed description of exemplary embodiments set forth below, to be considered in conjunction with the attached drawings, in which.

DETAILED DESCRIPTION OF THE DRAWINGS

Figure 1:
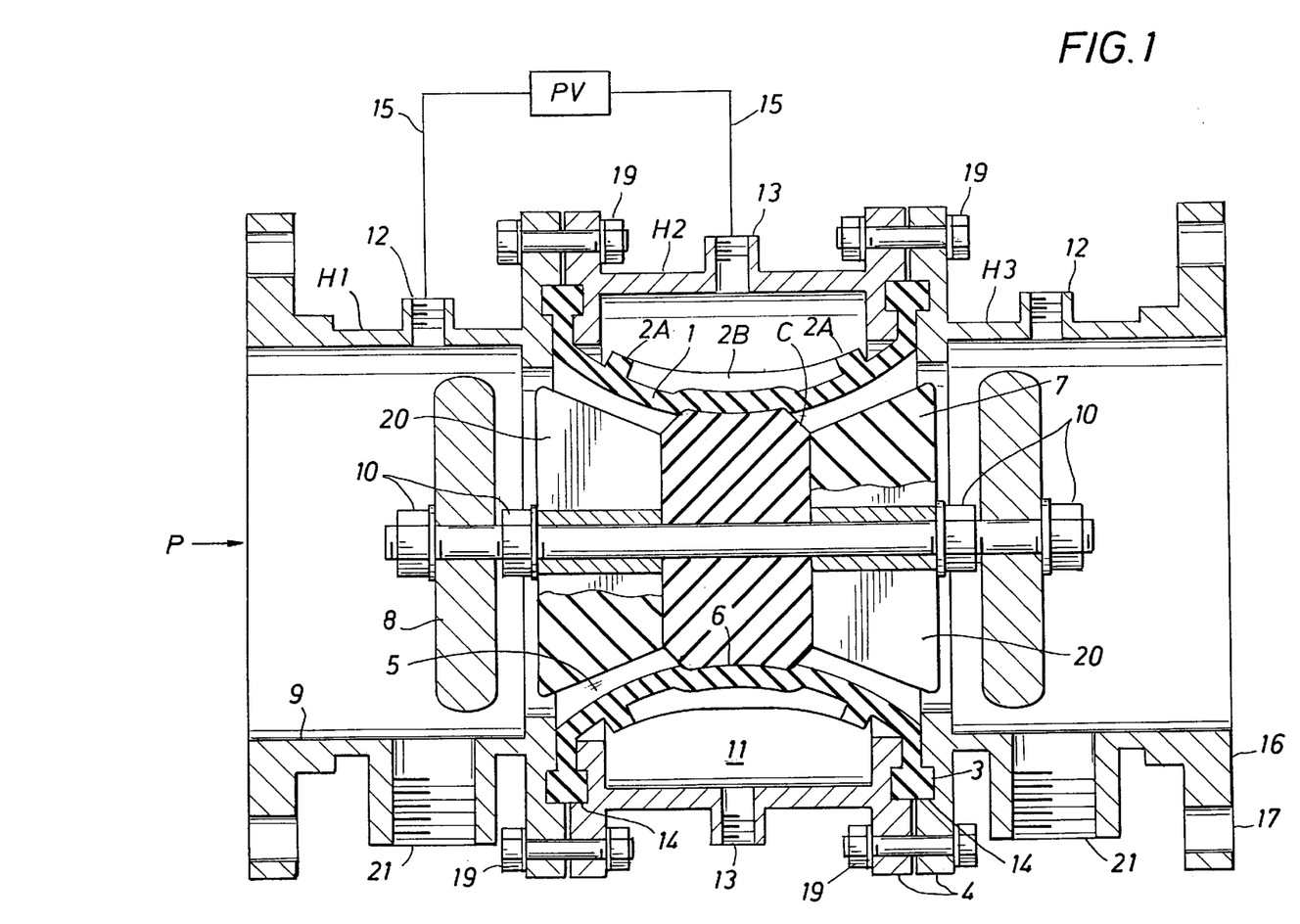
FIG. 1 illustrates in cross section one embodiment of the present invention having upstream and downstream fins.
Figure 2:
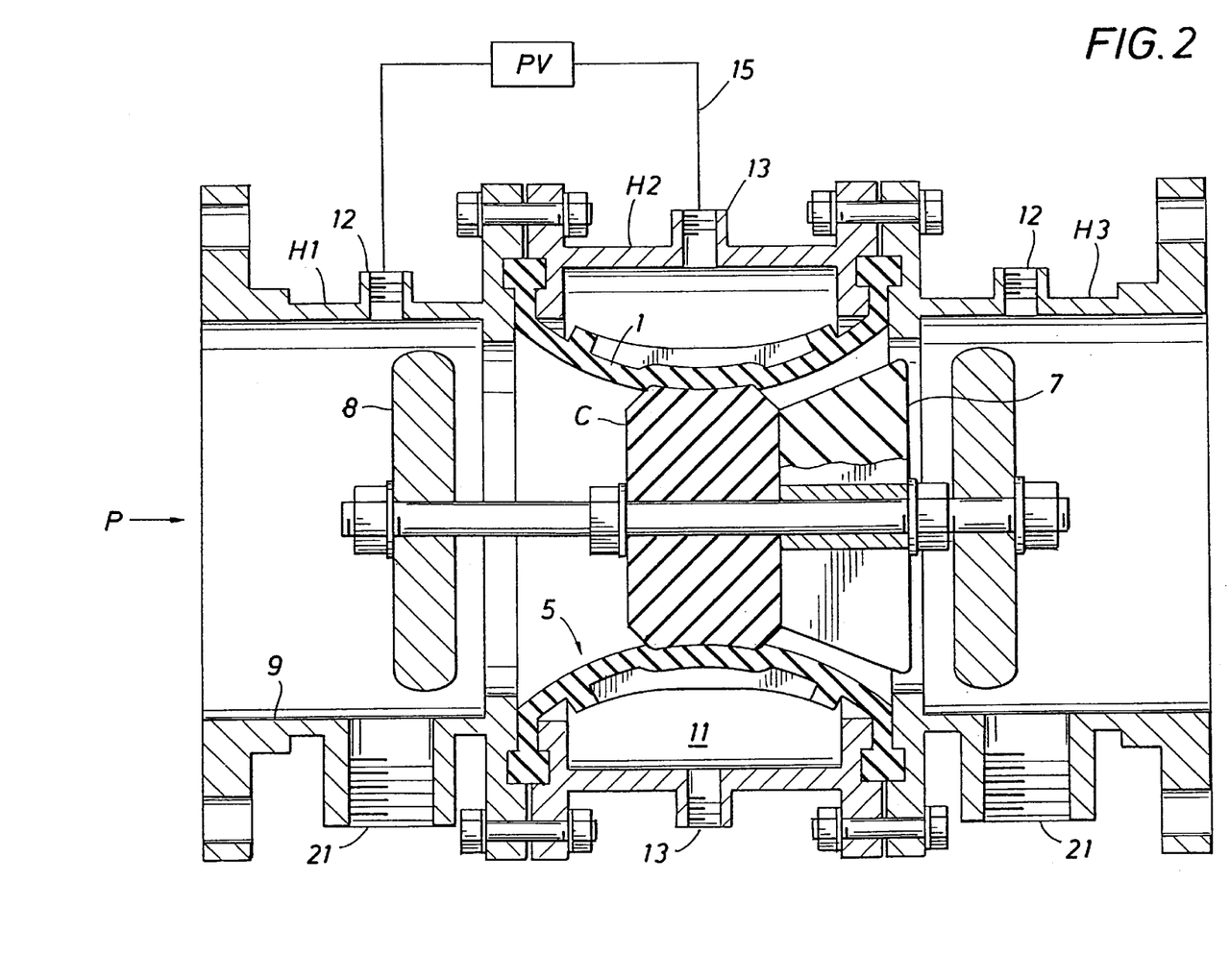
FIG. 2 illustrates the value of FIG. 1 having only downstream fins.

FIGS. 1 and 2 illustrate in longitudinal cross-section preferred embodiments of the present invention comprising a diaphragm type fluid flow control valve having a pair or single fin elements attached, respectively. The valve housing is shown comprised of three sections, end section H1, central section H2, and end section H3. Sections H1 and H2 and sections H2 and H3 are joined at flanges 4, the flanges being bolted together by bolts 19. Similar flanges exist at the end of housing sections H1 and H3 for bolting the valve in turn to pipelines.

The interior walls 9 of the housing define interior passage P. Barrier C with adjacent fin or fins 7 is attached centrally within passage P by means of structural piece 8 and bolt and locking mechanism 10.

Tubular diaphragm sleeve 1 is attached to the housing by means of compressing annular sleeve end portions 3 within shoulders 14 of flanges 4. Shoulders 14 and end portions 3 are structured such that bolts 19 can be tightened to secure flanges 4 together without harming sleeve 1, e.g. by maintaining a separation between the tightened flanges.

Portions of the interior wall of housing section H2 and the exterior of sleeve 1 define annular pressure chamber 11. Pressure chamber 11 communicates with passage P by means of ports 13 and 12 and communication means 15. Communication means 15 passes through pilot valve PV and into passage P. Multiple ports 12 and 13 can be utilized to establish flow communication. Alternately, some ports 12 and 13 can be closed off, such as with suitable plugs.

When the pressure is equalized, as through communication line 15 and pilot valve PV between upstream passage P and pressure chamber 11, sleeve 1 in its non-deformed or at rest configuration seats against seating surface 6 of barrier or core C, closing the annular flow passage 5 between core C and the interior of sleeve 1 through the valve. See FIGS. 5 and 8. It can be seen that as sleeve 1 seats on seating surface 6 of barrier or core C, sleeve 1 does not come into contact with the means for attaching the barrier to the housing.

If pressure is dropped in pressure chamber 11, as by means of pilot valve PV, the pressure on the upstream side of the valve forces sleeve 1 to deform or flex outwardly, into the area of pressure chamber 11. See FIGS. 7 and 9. Such outward deformation or flexing results in opening an annular flow passage 5 between barrier or core C and sleeve 1.

Figure 3:
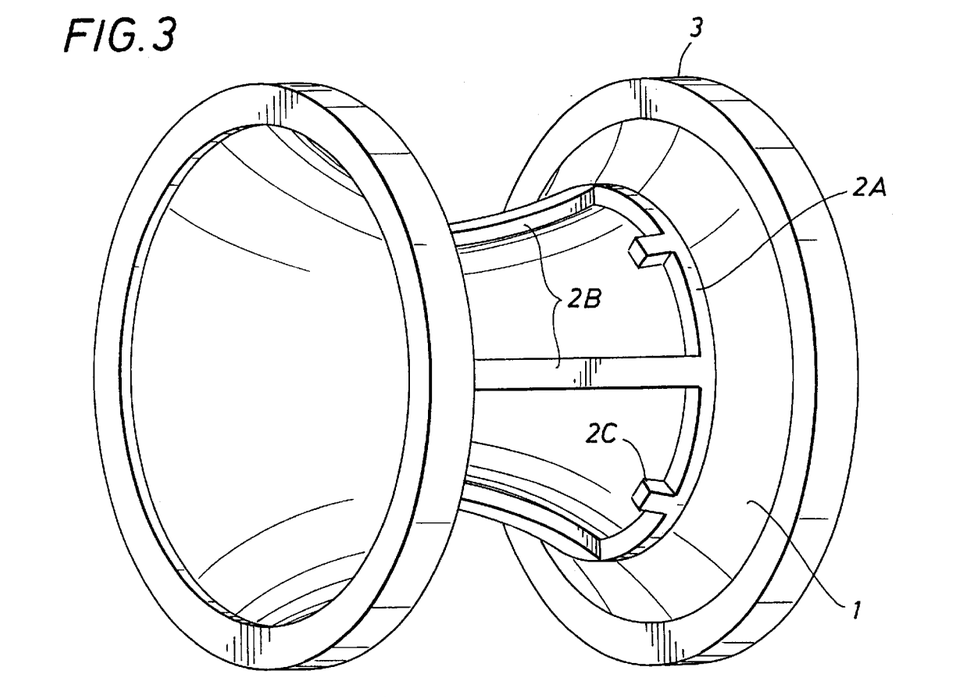
FIG. 3 illustrates a sleeve in perspective.

FIGS. 1, 2, 3 and in particular 4 illustrate preferred integral reinforcing ribs 2A, 2B and 2C on sleeve 1. Ribs 2A are located toward the ends of generally concave cylindrical sleeve 1 and are themselves circumferential. Ribs 2B and 2C are integral to sleeve 1 and longitudinal in direction. There are preferably four equally spaced longitudinal ribs 2B of extended length and eight equally spaced short longitudinal ribs 2C. The function of the integral ribs are to reinforce the sleeve, in particular in its non-deformed at rest conformation when the sleeve seals against core C, closing annular flow passage 5.

Figure 4:
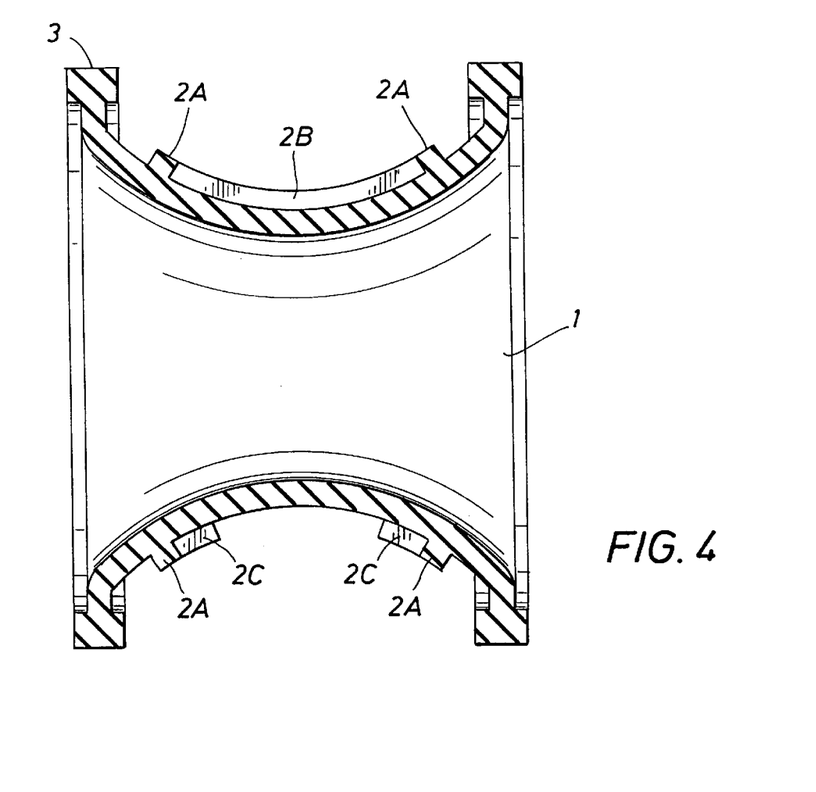
FIG. 4 illustrates a sleeve in cross-section.

FIGS. 3 and 4 illustrate the generally cylindrical concave shape of sleeve 1. In preferred embodiments the concave shape of sleeve 1 comprises an inverted sphere.

Also in preferred embodiments, core C offers a mating inverted spherical sealing surface. In its undeformed, at rest, position sleeve 1 seals against surface 6 of core C.

Preferably a pair of fin elements or single fin element 7 are attached in passage P of the valve. As FIGS. 1 and 2 illustrate, fins 7 may be attached to the downstream or to both the downstream and the upstream sides of core C. Fins 7 present fin edges 20 which conform in shape to the at rest, undeformed shape of portions of sleeve 1, when sealing against core C. The function of fins 7 is to prevent the substantial deformation of sleeve 1 under upstream pressure when left for long periods of time in the at rest, closed position.

The housing of the valve may be comprised of cast steel, fabricated tubular goods, or forged steel. The body might be comprised of cast nickel/aluminum/bronze or stainless steel for some applications.

Drains 21, shown in FIGS. 1 and 2, may be provided for safety as demanded by industry for some applications of the valve.

Core C may be comprised of structural plastics, such as polypropylene. Fins 7 may be comprised of the same material as the core.

Tests and studies have shown that a particularly suitable material for the elastomer sleeve is comprised of hydrogenated nitrile rubber. Studies have also shown that the preferred modulus of elongation (ultimate elongation) for the sleeve should lie between 100% and 500%.

Figure 5:
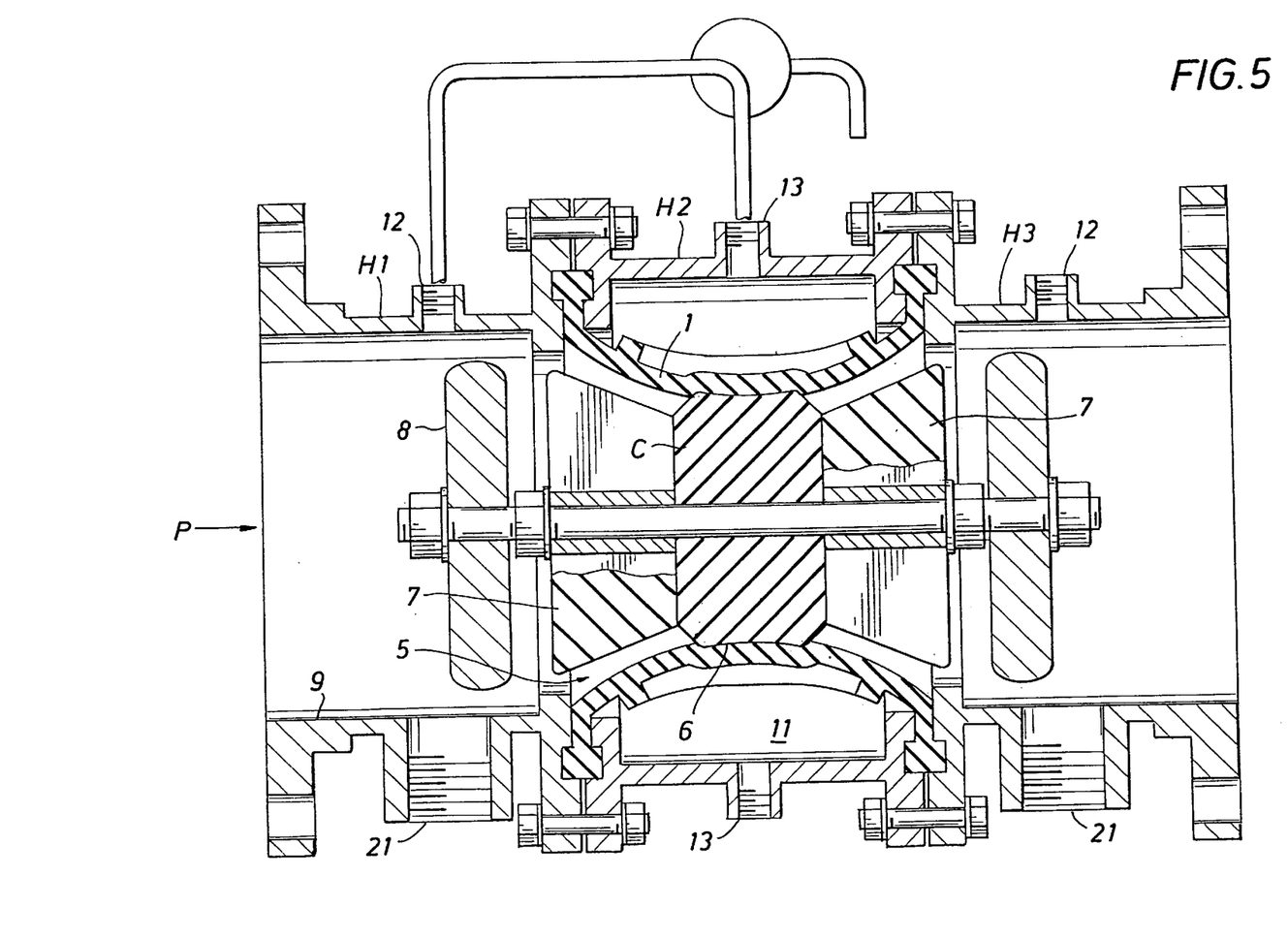
FIG. 5 illustrates the valve of FIG. 1 when closed.
Figure 6:
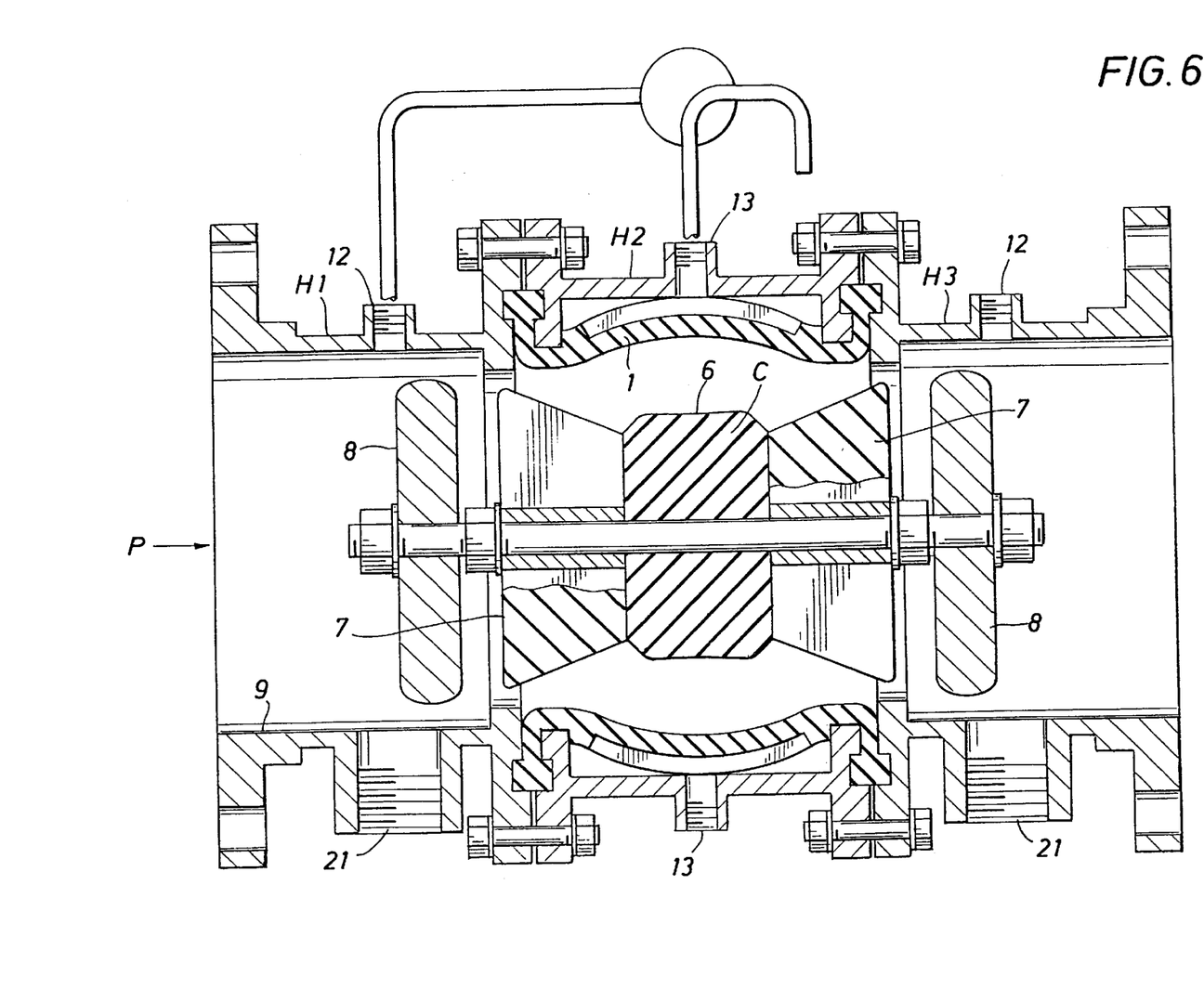
FIG. 6 illustrates the valve of FIG. 1 when opened.
Figure 7:
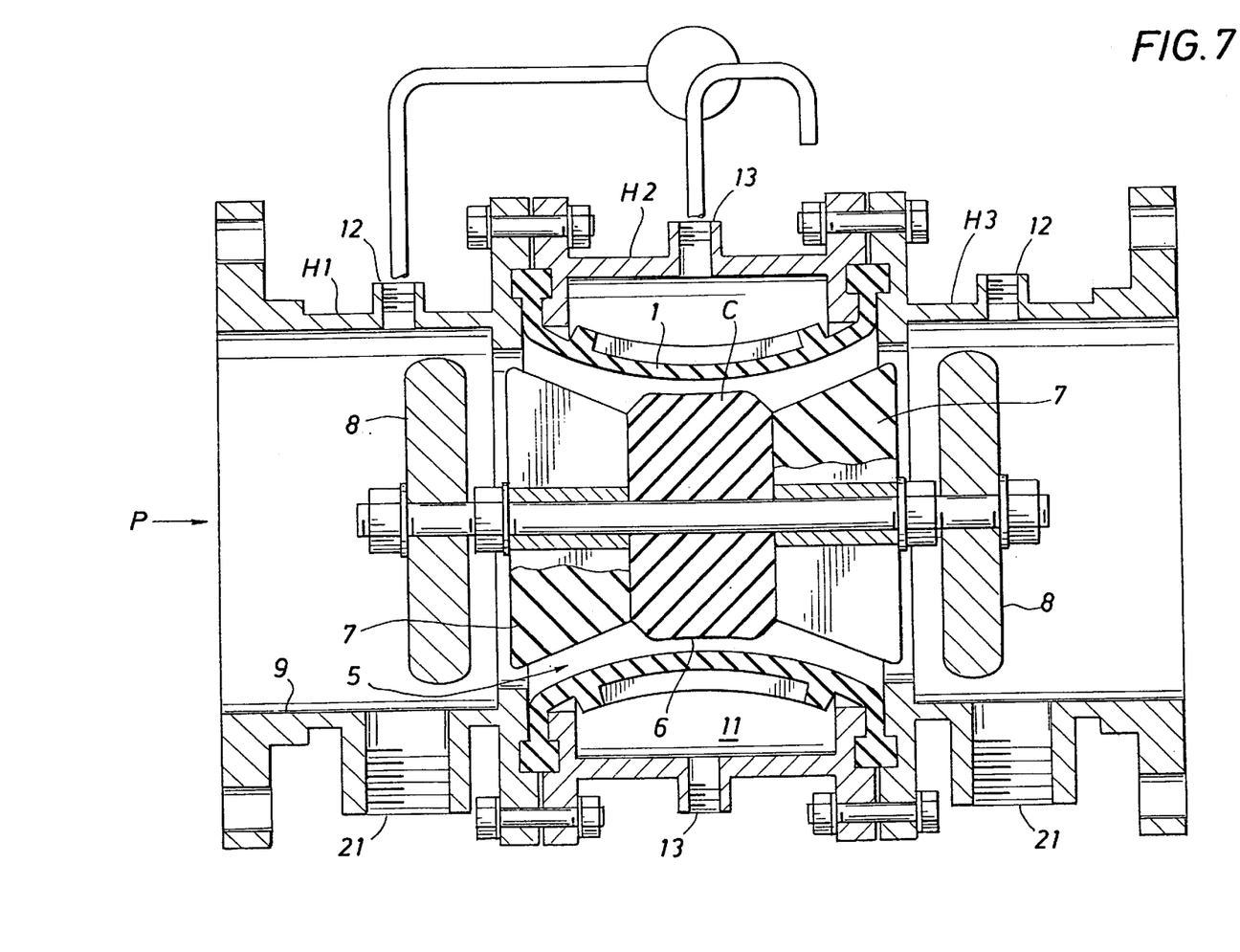
FIG. 7 illustrates the valve of FIG. 1 when modulating.
Figure 8:
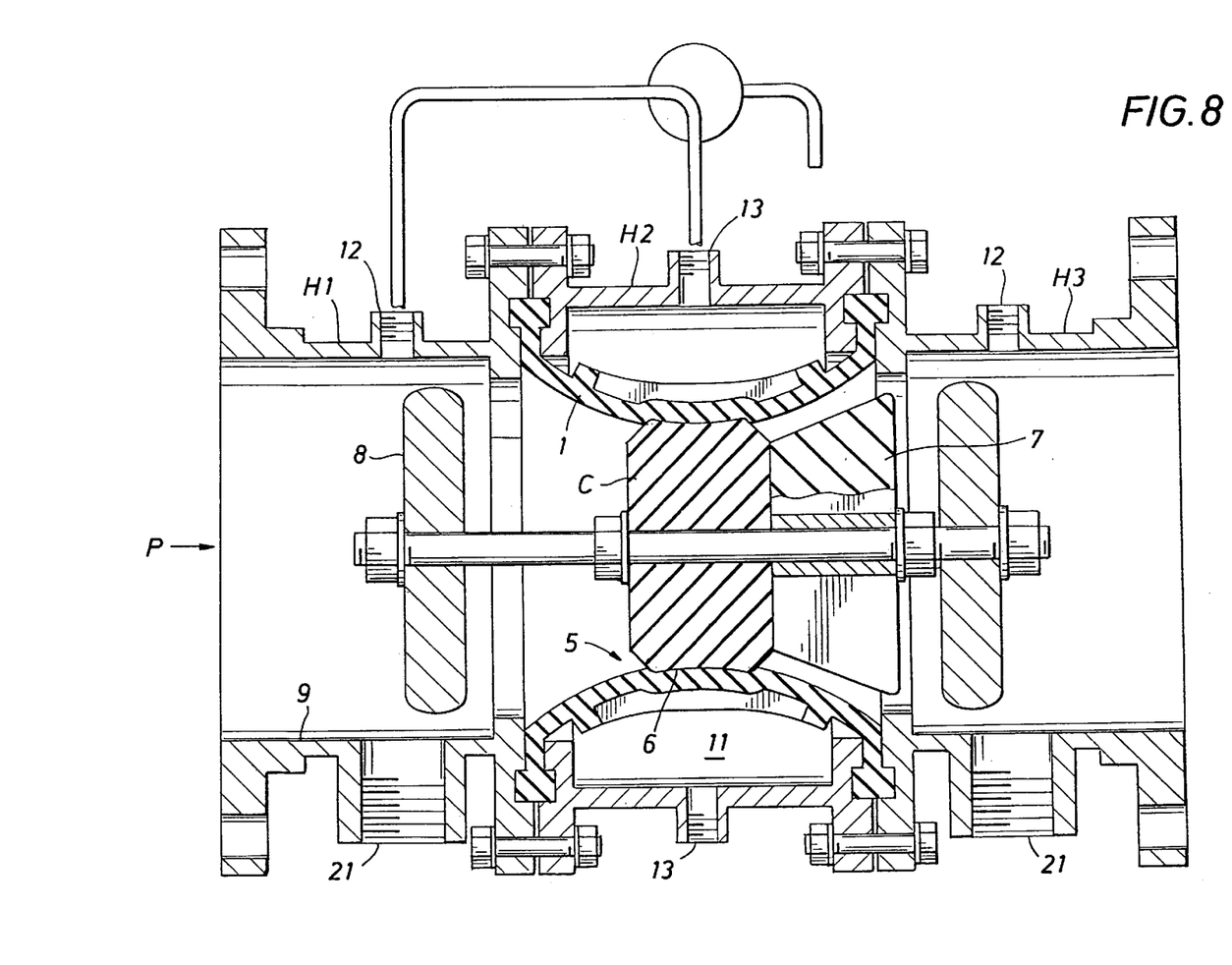
FIG. 8 illustrates the valve of FIG. 2 when closed.
Figure 9:
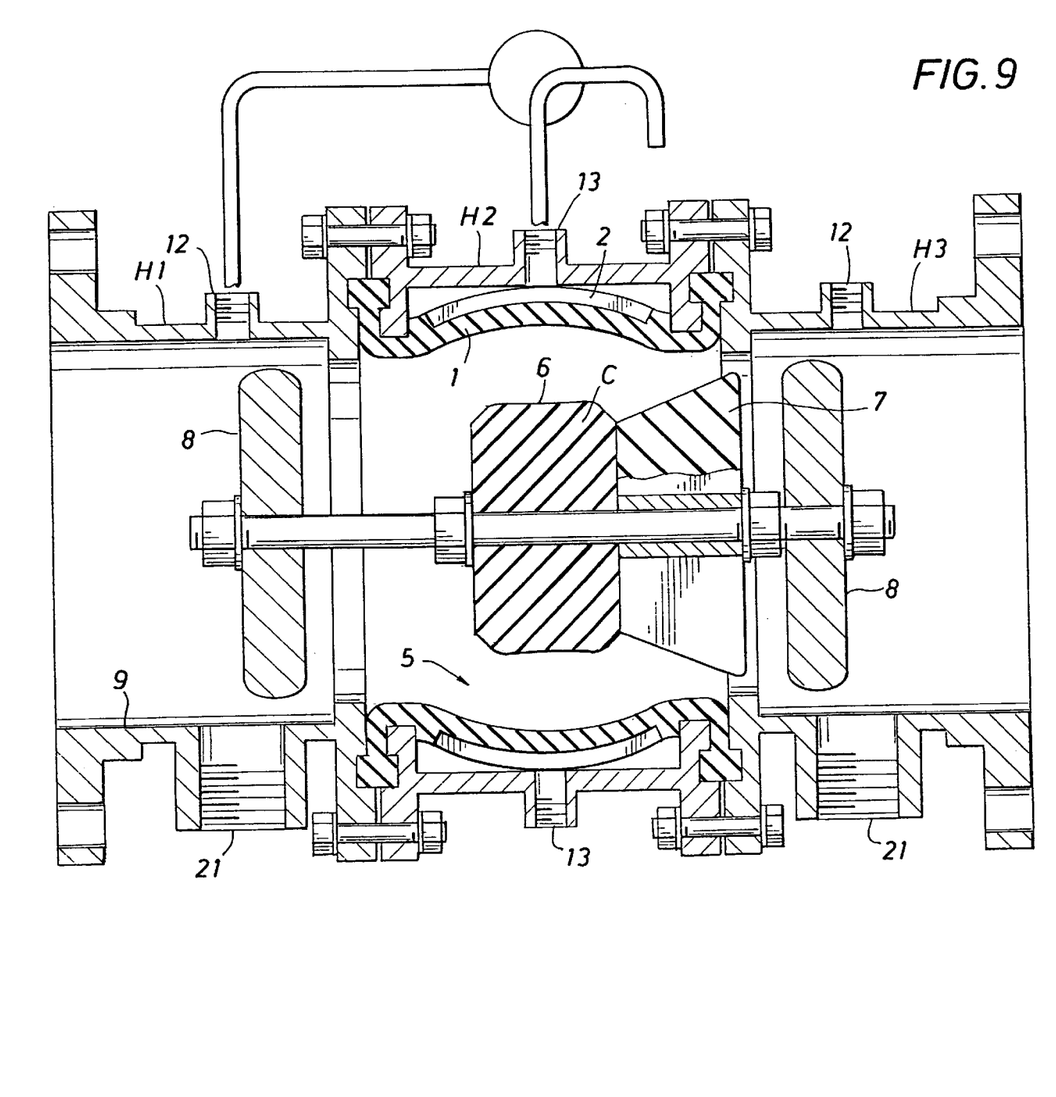
FIG. 9 illustrates the valve of FIG. 2 when opened.
Figure 10:
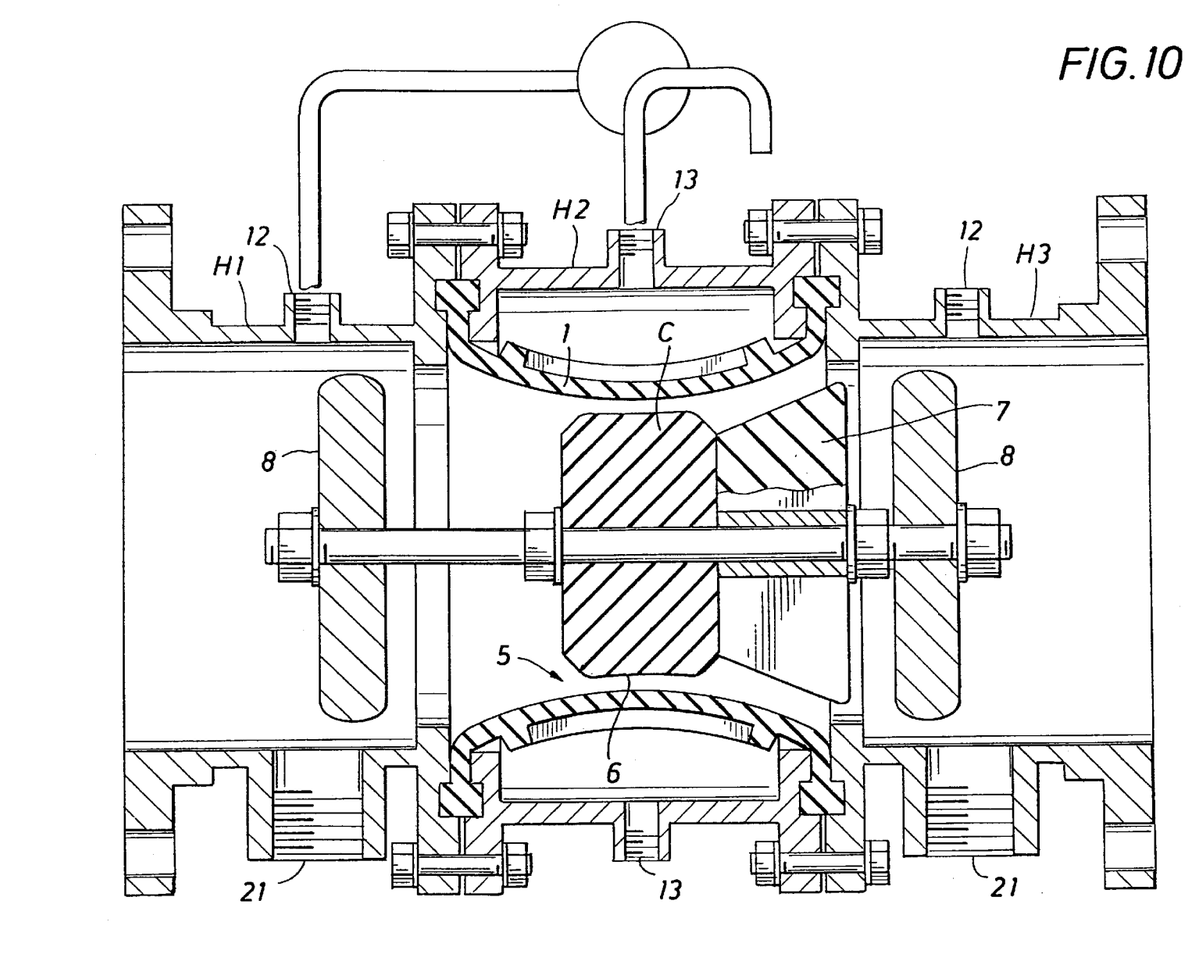
FIG. 10 illustrates the valve of FIG. 2 when modulating.
Figure 11:
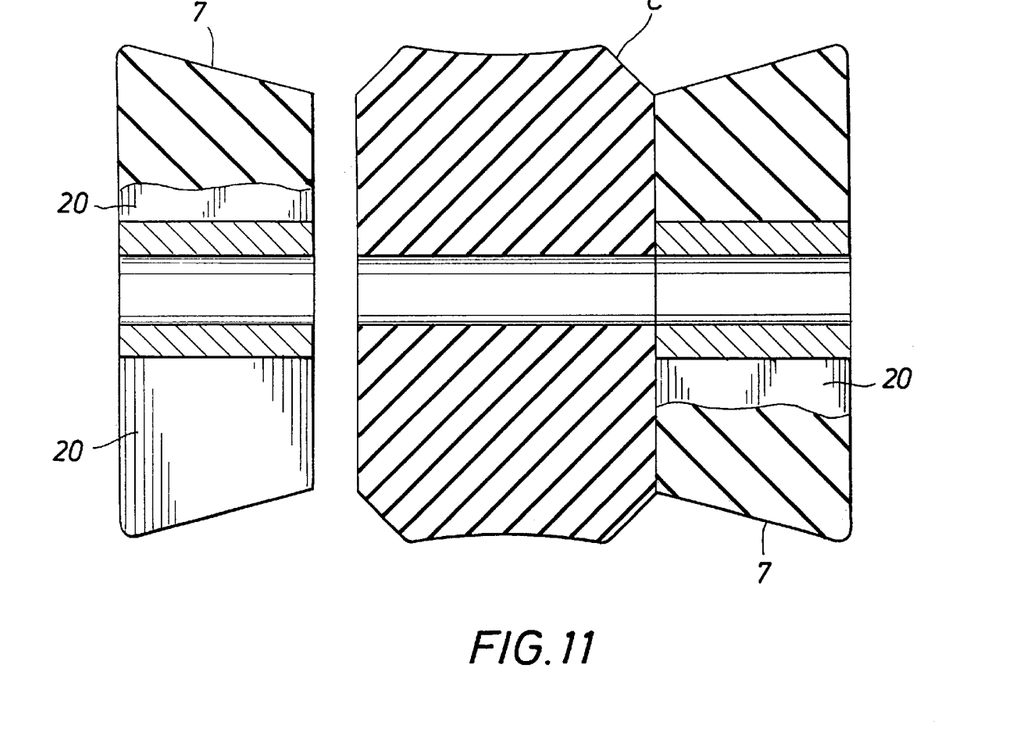
FIG. 11 illustrates the core with fins.
Figure 12:
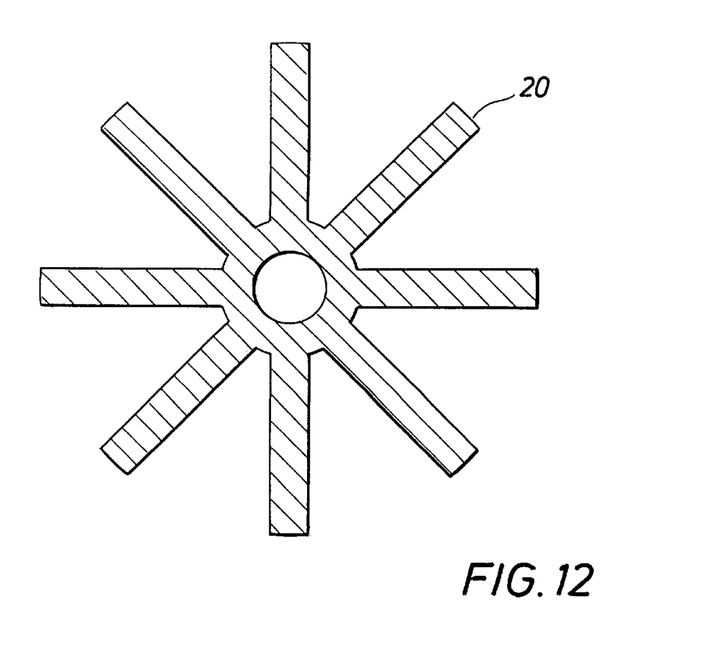
FIG. 12 offers an end view of a fin.
Figure 13:
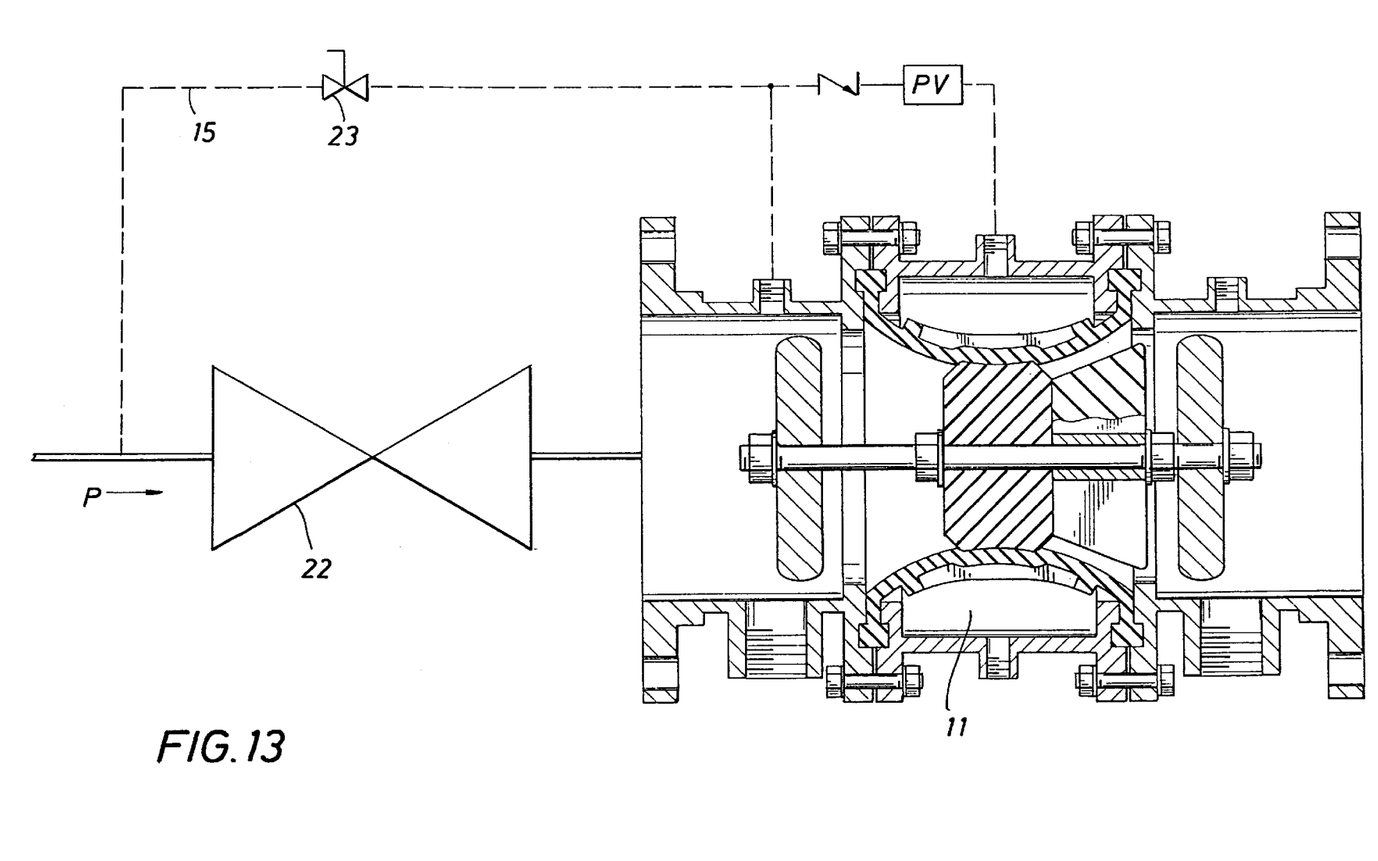
FIG. 13 illustrates in diagrametric fashion the use of a manual valve in conjunction with the fluid control valve of the present invention for certain applications.

FIGS. 5, 6 and 7 illustrate use of the valve of FIG. 1 in closed, open and modulating positions, respectively. FIGS. 8, 9 and 10 illustrate use of the valve of FIG. 2 in closed, open, and modulating positions. FIG. 13 illustrates a further configuration of the instant fluid control valve in a deluge application. In the unloaded closed position, fluid pressure, equal to inlet pressure from the valve inlet or from upstream of the fluid control valve, is applied to the control chamber. In this condition sleeve 1 closes bubble tight against core C. When pressure in the control chamber 11 is relieved, as illustrated in FIGS. 6 and 9, the annular region 5 between core C and sleeve 1 opens with sleeve 1 deforming back into the space of chamber 11.

As illustrated in FIGS. 7 and 10, the fluid control valve can be set to hold an intermediate or modulated position. A quantity of fluid can be exhausted from control chamber 11 as established by a set pressure of pilot valve PV. The control chamber may be filled or exhausted to atmosphere in order to maintain such set pressure. Such a configuration permits partial flow through annular region 5.

FIG. 13 illustrates a particular application of the fluid flow control valve. With a deluge valve application a manual block valve 22 is established upstream of the flow control valve. A normally closed valve 23 is installed in the means of communication 15 between the upstream end of the deluge valve and the pilot valve and control chamber 11. Such a configuration may be required if the deluge valve must be closed when being put into service since in such cases, water cannot be discharged at all, as it might discharge onto valuable equipment.

The foregoing disclosure and description of the invention are illustrative and explanatory thereof, and various changes in the size, shape, and materials, as well as in the details of the illustrated system may be made without departing from the spirit of the invention.

What is claimed is:

1. A sleeve valve, comprising:
   a housing defining a passage therethrough;
   a core attached within the passage;
   a generally concave cylindrical deformable sleeve sealingly surrounding the core at rest, sealingly attached at sleeve ends to the housing, the sleeve and the housing defining a pressure chamber therebetween; and
   a plurality of fins attached in the passage at least downstream of the core, the fins having edges conforming to the shape of a portion of the non-deformed sleeve and being substantially free of contact with the housing and wherein the deformed sleeve, core, housing and fins define a portion of substantially open annular flow passageway, longitudinally.

2. The valve of claim 1 that includes means for fluid communication between the pressure chamber and the passage.

3. The valve of claim 2 that includes a pilot valve in fluid communication with the pressure chamber.

4. The valve of claim 3 wherein the pilot valve is operated by a solenoid.

5. The valve of claim 3 wherein the pilot valve is operated by fluid pressure.

6. The valve of claim 3 wherein the pilot valve is operated by air pressure.

7. A sleeve valve, comprising:
   a housing defining a passage therethrough;

a core attached within the passage having a concave sealing surface; and a generally concave cylindrical deformable sleeve sealingly surrounding the core at rest, sealingly attached at sleeve ends to the housing, the sleeve and the housing defining a pressure chamber therebetween, the deformed sleeve and core defining an annular flow passage therebetween.

8. A sleeve valve, comprising:

a housing defining a passage therethrough;

a core attached within the passage; and a generally concave cylindrical deformable sleeve sealingly surrounding the core at rest, sealingly attached at sleeve ends to the housing, the sleeve and the housing defining a pressure chamber therebetween, the deformed sleeve and the core defining an annular flow passage therebetween, the sleeve including a plurality of longitudinal ribs integrally formed of sleeve material.

9. A sleeve valve, comprising a housing defining a passage therethrough;

a core attached within the passage; and a generally concave cylindrical deformable sleeve sealingly surrounding the core at rest and sealingly attached at sleeve ends to the housing;

the sleeve including a planarity of circumferential ribs integrally formed of sleeve material, one located toward an end of each sleeve.

10. The valve of claims 1, 8 or 9 wherein the core includes a concave sealing surface.

11. The valve of claims 7 or 9 wherein the sleeve includes a plurality of longitudinal ribs integrally formed of sleeve material.

12. The valve of claims 7 or 8 wherein the sleeve includes a plurality of circumferential ribs integrally formed of sleeve material.

13. The valve of claims 1, 7, 8 or 9 wherein the sleeve is comprised of hydrogenated nitrile rubber.

14. The valve of claims 1, 7, 8 or 9 wherein the sleeve is comprised of material having a modulus of elongation of between 100% and 500%.

15. The valve of claims 7, 8 or 9 that includes fins attached downstream in the passage adjacent the core, the fins having edges substantially conforming to a portion of the non-deformed sleeve.

16. The valve of claims 1, 7, 8, or 9 wherein the generally concave shape is comprised of an inverted sphere.

17. The valve of claims 1, 7, 8 or 9 wherein the sealing attachment of the sleeve ends to the housing comprises compressing an enlarged portion of a sleeve end between two flanges such that the two flanges compressing the enlarged end maintain a separation.

18. A sleeve valve, comprising:

a housing defining a a passage therethrough:

a core attached within the passage;

a generally concave cylindrical deformable sleeve sealingly surrounding the core at rest, sealingly attached at sleeve ends to the housing, the sleeve and the housing defining a pressure chamber therebetween, the deformed sleeve and core defining an annular flow passage therebetween;

a plurality of fins attached in the passage at least downstream of the core, the fins having edaes conforming to the shape of a portion of the non-deformed sleeve, and wherein the sleeve includes a plurality of longitudinal ribs integrally formed of sleeve material.

19. A sleeve valve, comprising:

a housing defining a passage therethrough:

a core attached within the passage;

a generally concave cylindrical deformable sleeve sealingly surrounding the core at rest, sealingly attached at sleeve ends to the housing, the sleeve and the housing defining a pressure chamber therebetween, the deformed sleeve and core defining an annular flow passage therebetween;

a plurality of fins attached in the passage at least downstream of the core, the fins having edges conforming to the shape of a portion of the non-deformed sleeve, and wherein the sleeve includes a plurality of circumferential ribs integrally formed of sleeve material.

* * * * *

UNITED STATES PATENT AND TRADEMARK OFFICE
CERTIFICATE OF CORRECTION

PATENT : 6,047,943
DATED : April 11, 2000
INVENTOR(S) : James J. Hussey

It is certified that error appears in the above-identified patent and that said Letters Patent is hereby corrected as shown below:

Column 2, line 33: change "value" to --valve--.

Column 6, line 23: change "edaes" to --edges--.

Signed and Sealed this

Twentieth Day of March, 2001

Attest:

NICHOLAS P. GODICI

Attesting Officer     Acting Director of the United States Patent and Trademark Office